July 29, 1924.
R. F. HOLSER ET AL
1,502,776
VINE PICK-UP
Filed Jan. 28, 1922   3 Sheets-Sheet 3
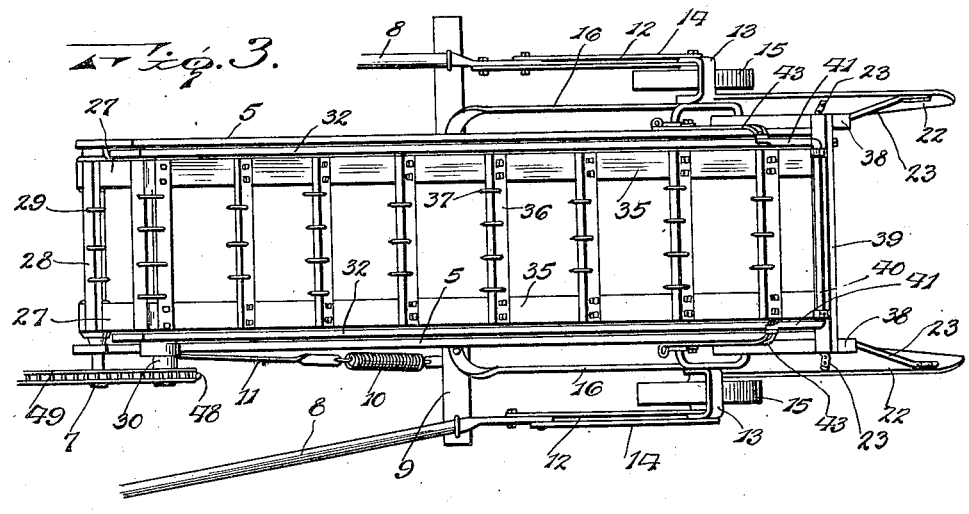
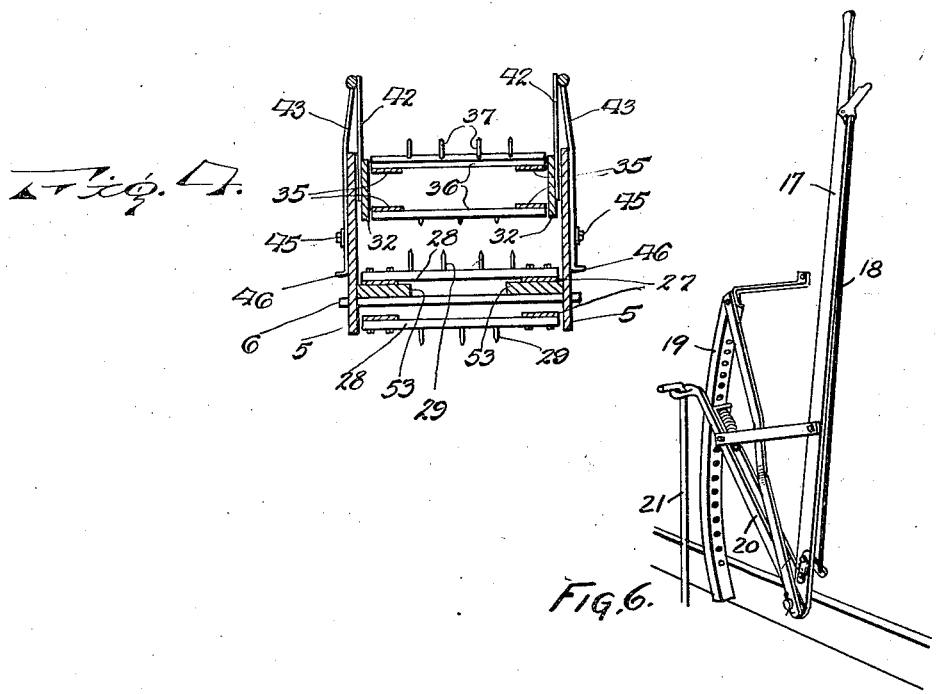
Inventor
Raymond F. Holser.
Joseph V. Lopez.
By Lacey Lacey, Attorney Patented July 29, 1924.

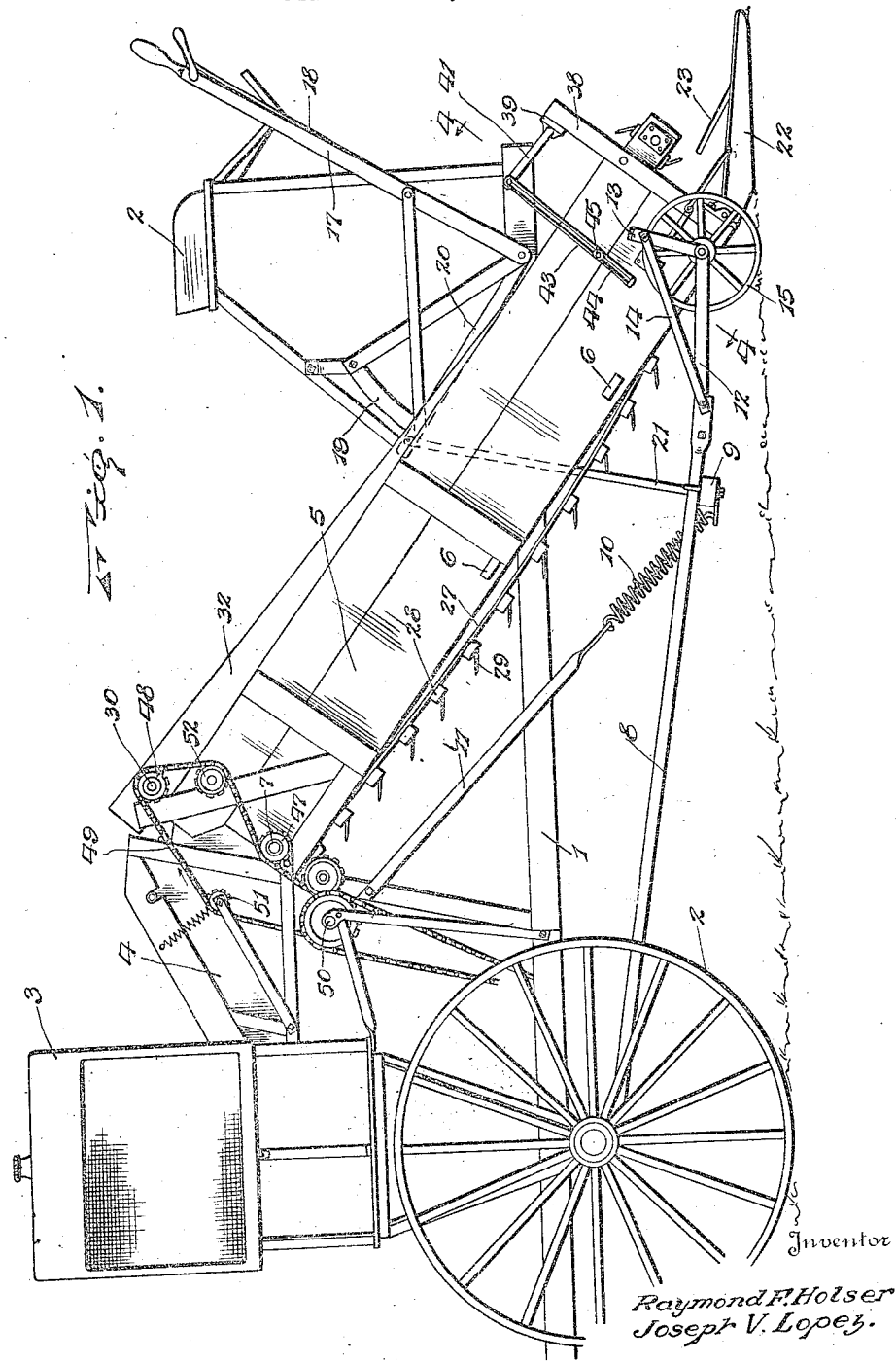

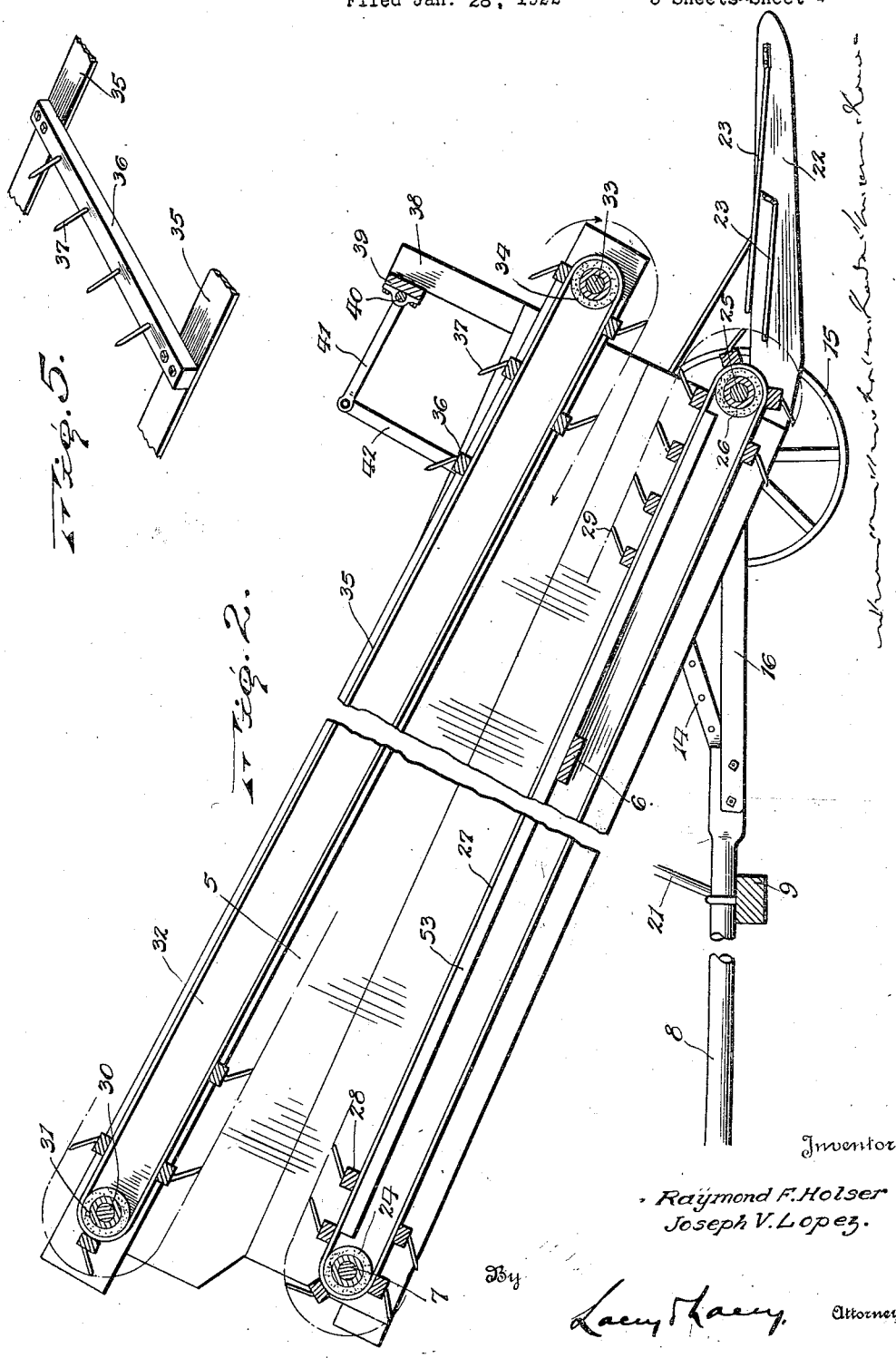

1,502,776

UNITED STATES PATENT OFFICE.

RAYMOND F. HOLSER AND JOSEPH V. LOPEZ, OF SANTA MARIA, CALIFORNIA.

VINE PICK-UP.

Application filed January 28, 1922. Serial No. 532,398.

*To all whom it may concern:*

Be it known that we, RAYMOND F. HOLSER, a citizen of the United States, and JOSEPH V. LOPEZ, a citizen of Portugal, residing at Santa Maria, in the county of Santa Barbara and State of California, have invented certain new and useful Improvements in Vine Pick-Ups, of which the following is a specification.

This invention has for its object the provision of a mechanism whereby vines, such as bean or pea vines and similar crops, deposited upon a field may be taken up and delivered into a threshing machine, or into a wagon or other conveyance, as the machine is drawn over the field. A particular object of the invention is to provide a mechanism which may be readily connected with or attached to a combined grain harvester and thresher so that the same harvesting and threshing apparatus may be employed to harvest other crops. The invention seeks to provide an apparatus for the stated purpose in which the elements for picking up the vines will be so arranged as to operate efficiently and discharge the vines without dragging the vines or becoming entangled therewith at the delivery end of the apparatus. The invention also seeks to provide means whereby the mechanism may be adjusted so as to be carried free of the ground when being moved from field to field and also to provide means whereby the vine-engaging elements may be adjusted to the thickness or volume of the vines to be taken up. The several stated objects and other objects which will appear incidentally in the course of the following description are attained in such a mechanism as is illustrated in the accompanying drawings, and the invention resides in certain novel features which will be particularly pointed out in the claims following the description.

In the drawings—

Figure 1 is a side elevation of our improved mechanism showing it arranged for use;

Fig. 2 is an enlarged longitudinal section showing the mechanism arranged to run free of the ground so that it may be moved without operating;

Fig. 3 is a plan view of the apparatus;

Fig. 4 is a detail transverse section on the line 4—4 of Fig. 1;

Fig. 5 is a detail view of a portion of one of the conveyers.

Fig. 6 is a detail.

In the drawings, the reference numeral 1 indicates a portion of the frame of a combined harvester and thresher equipped with a seat 2 for an operator and adapted to be drawn over a field by a tractor or by draft animals. This frame 1 is supported upon ground wheels 2 and a portion of the threshing mechanism is indicated conventionally at 3, a chute 4 being provided on the front side of said threshing mechanism to receive the vines from the pick-up apparatus and deliver them into the threshing mechanism. It will, however, be understood that the vines or other crops taken up may be delivered into a wagon to be subsequently taken from the field.

In carrying out our invention, we arrange at the side of the frame 1, and in advance of the ground wheel 2 at the same side of said frame, an inclined frame consisting of side plates or boards 5 and cross bars 6 connecting the said side plates at intervals. This frame is disposed in a downwardly and forwardly inclined position, as shown in Figs. 1 and 2, and its upper end is supported upon a shaft 7 which is mounted in suitable bearings at the lower front side of the chute 4, this arrangement permitting a limited vertical pivotal movement of the inclined frame, as will be readily understood. Braces 8 extend from the front end of the inclined frame to the axle of the wheels 2 and these braces are connected by a cross beam 9 which extends transversely below the inclined frame and to which a spring 10 is secured. This spring has its upper end attached to a link 11 which extends upwardly and rearwardly and is secured to a fixed part of the main frame. To the front ends of the braces 8, we secure wheeled carrying frames, each consisting of a bar 12 extending forwardly and terminating in an arch 13, a brace 14 being extended between the side of the arch and the end of the brace 8, as shown clearly in Fig. 1. The arch 13 extends over a roller or wheel 15 which is carried by bearings at the front end of the bar 12, and at the front end of a similar bar 16 which extends rearwardly from the arch at the inner side thereof and is secured rigidly at its rear end to the beam 9, as shown most clearly in Fig. 3. This arrangement is employed at both sides of the apparatus so that, when the pick-up mechanism is in use, it will be supported evenly and will readily pass over the surface of the ground. The described construction also provides a firm support for each of the rollers 15 and maintains them in their proper relative positions without requiring the axle of the wheels to pass through the frame of the pick-up mechanism. To adjust the inclined frame pivotally in a vertical plane, we provide upon the side of the main frame 1 a hand lever 17 which may be easily manipulated from the seat 2 and which is equipped with a latch 18 co-operating with a segment 19 upon the said frame. A lifting arm 20 extends from the lower end of the lever 17 and is connected by a link 21 with the beam 9 so that, if the lever be oscillated, the link 21 will be raised or lowered and, consequently, the front end of the apparatus set higher or lower.

To the lower end of each side plate 5, we secure a wing or guide 22 which extends forwardly from the frame and is adapted to run upon the ground in advance thereof so that the vines to be taken up will be directed to a position in front of the take-up elements and be readily engaged by them. These wings or guides may be of any desired form and, in the illustrated arrangement, are provided with inwardly and upwardly extending fingers 23 whereby the vines are deflected toward the path of the apparatus so as to be readily taken up.

Upon the shaft 7, we secure rollers or drums 24, and at the lower end of the side plates, we provide a similar shaft 25 and rollers 26 about which are trained endless belts 27 which may be of any flexible material having the requisite strength and durability, and these belts 27 are connected at intervals by cross bars 28. Projecting from the several cross bars 28 are pins 29 which are disposed obliquely in such manner that the pins on the lower runs of the belts will project rearwardly, while those on the upper runs of the belts will project forwardly whereby as the pins are carried around the lower bights of the belts or around the rollers 26, the pins will move against the vines and tend to pick them up or to roll them over and effect an accumulation of the same. The vines taken up by the pins will be carried to the upper end of the inclined frame and as the pins are carried around the rollers 24, the vines will slip off the pins into the chute 4 and then pass into the threshing mechanism. The described inclination of the pick-up fingers will permit them to readily clear themselves of the vines at the delivery end of the elevator so that the vines will not be carried around or accumulated at the upper end of the mechanism and tend to choke the operation. Supported by the upper corners of the side plates 5 is a shaft 30 carrying rollers 31 similar in all respects to the rollers 24 and upon the said shaft 30, immediately adjacent the inner faces of the side plates 5, boards or bars 32 are pivotally hung. The lower ends of these bars 32 project beyond the lower front ends of the side plates 5 and in the said projecting ends, we mount a shaft 33 carrying rollers or drums 34. Endless belts 35 are trained around the rollers 31 and 34 and these belts are connected by cross bars 36 at intervals, the cross bars carrying pins 37 which are disposed obliquely but are arranged so that the pins on the upper runs of the plates will project rearwardly, while those on the lower runs of the belt will project forwardly. The cross bars 36 are spaced wider apart than the bars 28 and the pins 37 may be fewer in number than the pins 29 inasmuch as the pins of the upper conveyer or elevator are not called upon to sustain the great weight of the vines, which is principally borne by the lower conveyer. Inasmuch as the roller 34 is disposed in advance of the vertical plane of the roller 26, the pins 37, as they travel around the lower bights of the belts 35, will be caused to act upon the upper portion of the row or pile of vines and will, consequently, engage in the mass of vines and feed it to and onto the pins 29 of the lower elevating conveyer. The continued action then will draw the vines into the space between the two elevating conveyers and carry them up to the chute 4, as will be readily understood. Inasmuch as the vines will vary in volume, according to the different crops, it is desirable to adjust the lower end of the upper elevating conveyer toward the front or lower end of the lower elevating conveyer in order to obtain the most efficient results. To effect this adjustment, we provide posts 38 which are secured rigidly to the side plates 5 and project above the same at the lower ends thereof, and to and between the upper ends of these posts we secure a cross bar 39. Upon the cross bar 39, we mount a rock shaft 40 having cranks 41 at its ends projecting rearwardly. To the rear ends of these cranks 41, we pivotally secure hangers 42 which depend from the cranks and are secured at their lower ends to the bars 32 so that if movement be imparted to the rock shaft 40, the bars 32 will be moved upwardly or downwardly. We also pivotally attach to the rear ends of the cranks 41 the upper ends of adjusting links 43 which depend from the cranks at the outer sides of the side plates 5 and are longitudinally slotted, as shown at 44, to engage over bolts 45 secured in said side plates. The lower ends of the links 43 may be bent outwardly, as shown at 46, to constitute handle members and also to permit the links to readily clear the bolts 45 when necessary. It will be readily understood that by loosening the nuts upon the bolts 45, the links 43 may be manually shifted upwardly or downwardly and the hangers 42 will be consequently raised or lowered so as to set the lower end of the upper elevating conveyer at a higher or lower position. Obviously, when the nuts are again turned home, the conveyer will be secured in the position in which it has been set.

The ends of the shafts 7 and 30 project through the side plates 5 and the bars 32 at one side of the apparatus and are equipped with sprockets 47 and 48 respectively around which is trained a chain 49. The chain 49 receives motion from a counter shaft 50 which is carried by the main frame of the thresher and is driven from the motor which actuates the thresher. Idlers 51 and 52 are provided to maintain the tension of the chain 49 and to guide the same properly to and about the conveyor driving sprockets 47 and 48.

As the machine is drawn over the field, the elevating conveyers will be set in motion through the described mechanism and the pins thereon will be caused to engage and pick up bunches of the vines which have been deposited along the path of travel. The vines will be carried upwardly between the two conveyers and delivered to the threshing machine, as previously stated, and this operation will be performed continuously as long as the machine is drawn along a wind row. It will be noted that at the delivery end of the conveyers, the pins which engage the vines and carry them to the delivery point are inclined in such manner that their points are in rear of their heads and consequently the vines will automatically clear themselves from the pins as the vines pass into the delivery chute, and entangling of the vines with the operating mechanism is thereby positively avoided. Our mechanism is simple in the construction of its parts and is free of complicated arrangements. The construction of the conveyers is such that there is no excessive weight and in order to prevent sagging of the belts of the lower conveyer under the weight of the vines being carried thereby, we provide the supporting rails 53 which extend longitudinally of the side plates 5 and are secured upon the inner faces of said side plates immediately below the upper runs of the belts 27 so that the said runs will be supported and the weight of the vines will be readily sustained.

Having thus described the invention, what is claimed as new is:

1. In an apparatus for the purpose set forth, the combination of a downwardly and forwardly inclined frame, upper and lower endless conveyers disposed within said frame, the upper conveyer being carried by side bars pivotally hung at their upper ends within the upper end of the frame, a rock shaft mounted upon the frame over the lower end of the upper conveyer, cranks extending rearwardly from said rock shaft, hangers pivoted to and depending from said cranks and secured to the said pivoted bars, and adjusting links pivoted at their upper ends to the said cranks and depending therefrom and having their lower portions adjustably secured upon the outer sides of the frame.

2. An attachment for threshers comprising an inclined frame to be arranged at the side of the thresher and in advance of the thresher carrying wheels, means for supporting the upper end of said frame upon the frame of the thresher, a cross bar disposed below the inclined frame, braces extending between said cross bar and the thresher frame, parallel bars, projecting forwardly from the front end of said braces, rolling supports carried by the front ends of said bars, connections between said bars and the sides of the inclined frame, and means connected with said cross bar for raising and lowering the front end of the inclined frame.

In testimony whereof we affix our signatures.

RAYMOND F. HOLSER. [L. S.]
JOSEPH V. LOPEZ. [L. S.]